Sept. 18, 1973    N. I. PALMER    3,759,748
ELECTRICALLY RECHARGED METAL/AIR CELL
Filed April 6, 1970    2 Sheets-Sheet 1
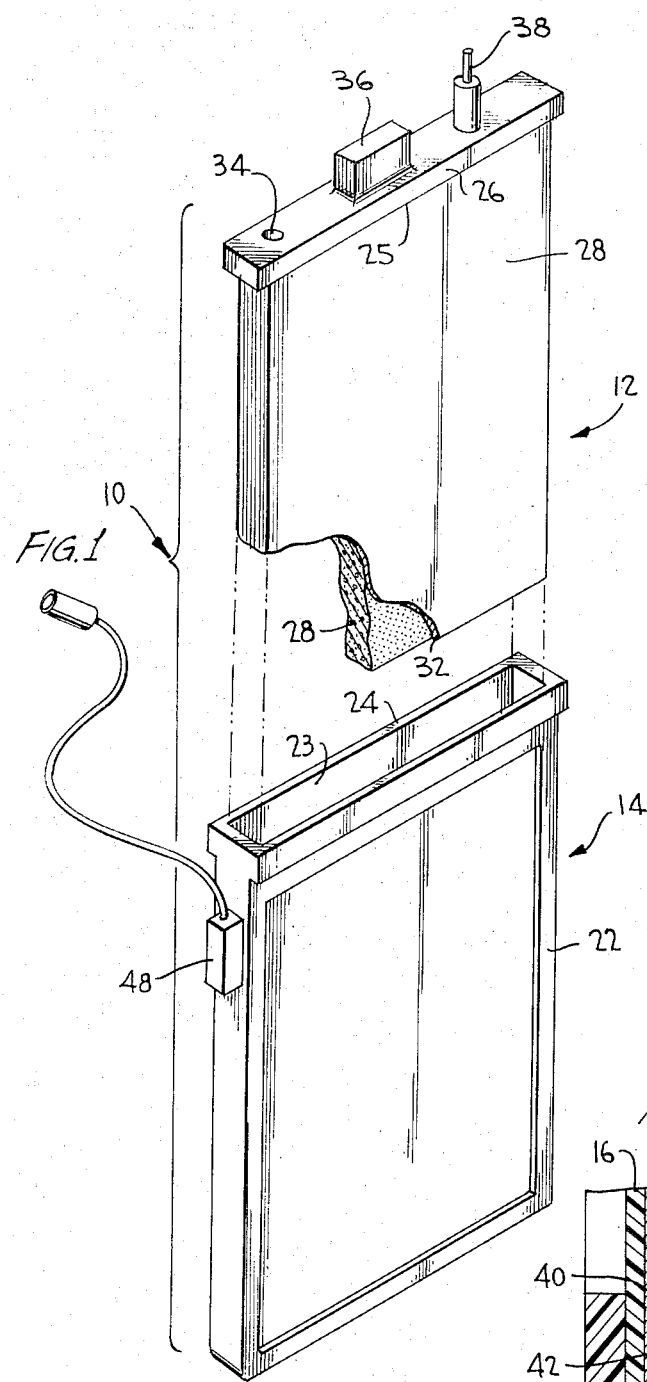
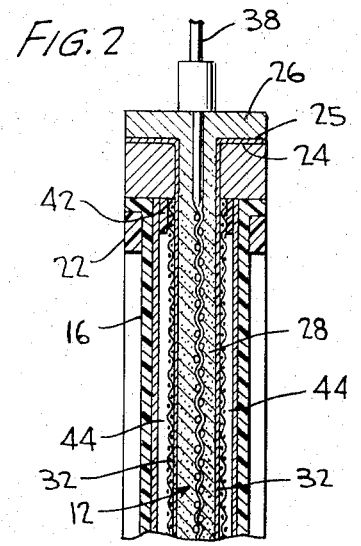
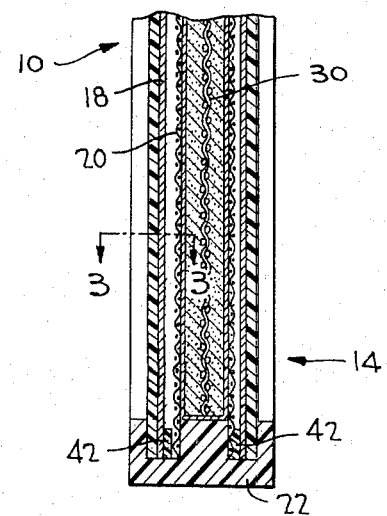
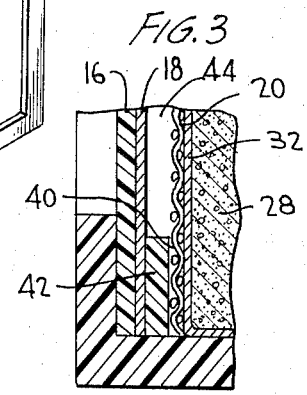
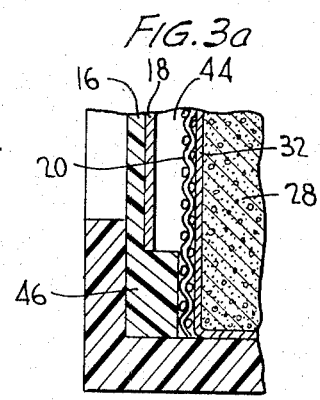
INVENTOR,
NIGEL I. PALMER Sept. 18, 1973      N. I. PALMER      3,759,748
ELECTRICALLY RECHARGED METAL/AIR CELL
Filed April 6, 1970      2 Sheets-Sheet 2
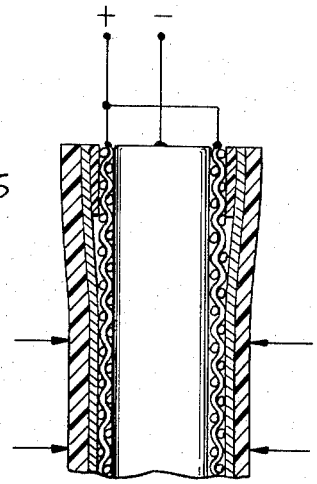
FIG.5
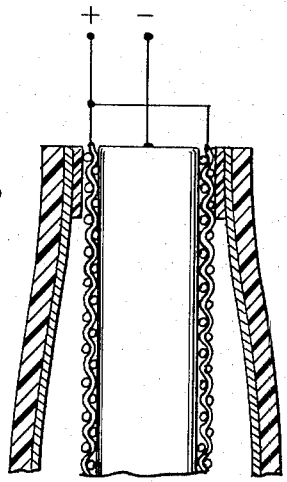
FIG.6
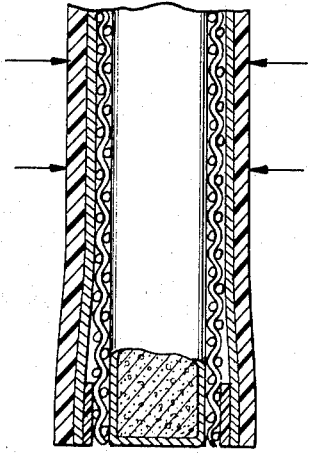
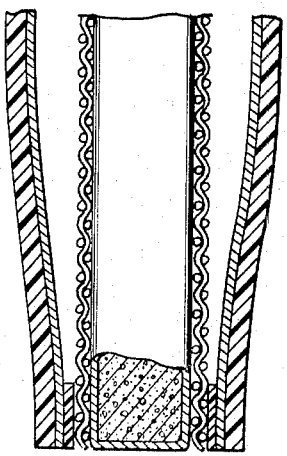
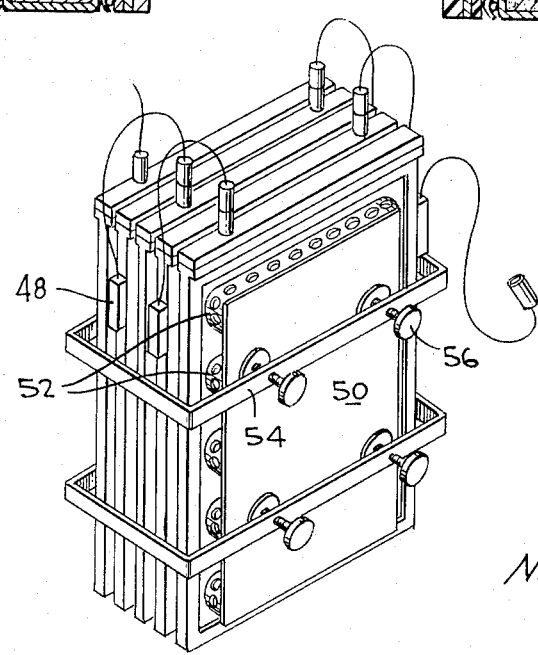
FIG.4
INVENTOR,
NIGEL I. PALMER United States Patent Office 3,759,748
Patented Sept. 18, 1973

3,759,748
ELECTRICALLY RECHARGED METAL/AIR CELL
Nigel I. Palmer, Port Washington, N.Y., assignor to
Leesona Corporation, Warwick, R.I.
Filed Apr. 6, 1970, Ser. No. 25,635
Int. Cl. H01m 27/00, 29/04
U.S. Cl. 136—86 A                             17 Claims

ABSTRACT OF THE DISCLOSURE

A two-electrode rechargeable metal/air or metal/oxygen depolarized electrochemical cell and method of generating electricity therefrom are described. The electrochemical cell comprises an anode capable of being regenerated, a composite cathode having an oxygen permeable hydrophobic member layered with catalyst, and a current collector in contact with the layered catalyst on said member. The cathode is constructed and arranged in order that the current collector is in removable electrical contact with the catalyst. Thus, for cell discharge, the current collector contacts the catalyst and transports electrons to the external circuit. For cell recharge, the current collector is electrically separated from the catalyst whereby numerous discharge-recharge cycles of the cell may be effected without damage to the cathode.

BACKGROUND OF THE INVENTION

Field of the invention

This invention relates to rechargeable or secondary batteries. More specifically, the invention relates to metal/air or metal/oxygen depolarized electrochemical cells having a composite cathode with a hydrophobic member, catalyst and current collector. The cathode is constructed and arranged whereby the current collector and catalyst are releaseably engaged.

Description of the prior art

In recent years the demand for lighter weight, reliable power sources with increased energy densities has intensified for both military and civilian programs. To fill this need, considerable attention and effort has been focused on the metal/air battery system and particularly the zinc/air primary system since this system has been commercially available for a considerable number of years and successfully used in applications requiring long life and reliability such as railway signaling and the like. Of late, increased military demand for primary batteries for navigation, communication, signaling and safety applications has been noted. Similarly, a need for improved secondary batteries of the metal/air type has heretofore remained unsatisfied.

The prior art teaches primary metal/air depolarized cells and batteries, including cells utilizing replaceable or mechanically rechargeable anodes; however, efforts to apply existing primary metal/air cell technology directly to the secondary or electrically rechargeable battery system have heretofore not met with economic success. It will be appreciated that the economics of secondary systems are of prime concern, as for example, when such systems are used in battery propelled vehicles and the like. Thus, a secondary cell having long life, reliability, high capacity, and fast recharging characteristics is essential for today's military and commercial applications.

Investigations were directed at determining causative relationships resulting in shortened cell life of secondary systems. One of the more significant factors detrimentally affecting the life of the cell is the deterioration of the cathode member brought about by the repeated discharge-recharge cycling. During the recharging portion of the cycle the potential of the cell is increased causing oxygen to be evolved at the cathode/catalyst-electrolyte interface. The formed oxygen gas may disrupt the catalyst layer of the cathode, irreversibly damaging its operating capability. Additionally the high potential or over voltage of the cathode can detrimentally corrode or oxidize the catalysts, further impairing its operation. With each cycle this effect becomes more apparent and in 15–20 cycles the cell may be virtually useless. This phenomenon was observed with a variety of different catalytic materials, including precious metal catalysts and carbon. Where carbon was used on the cathode membrane and repeatedly subjected to discharge-recharge cycling, the cathode life was about one-half of that obtained in a similar environment but without electrical recharging, i.e., with mechanical recharging of the cell.

One suggested approach to the shortened cell life problem utilizes a third or auxiliary electrode in lieu of the standard cathode for the purpose of recharging the cell. This third electrode, therefore, must be introduced into the circuitry prior to recharging, and disconnected from the circuitry prior to discharging, whereupon the standard electrodes, i.e., anode and cathode, are then reconnected. As will be appreciated, this system as a result of switching electrodes in the circuitry requires additional components (i.e., switches, etc.) and is accordingly costly and complex and increases the size of the battery.

It should be understood that the term "air depolarized" as used throughout the specification indicates the requirements of oxygen for operating the cathodic reduction reaction. Such oxygen may be provided in any number of ways, as for example, from the atmosphere or from specially prepared mixtures, in purified or semi-purified condition.

SUMMARY AND OBJECTS OF THE INVENTION

Broadly, the present invention encompasses a two-electrode, rechargeable electrochemical system for generating direct current. The electrochemical cell, as more fully described hereinafter, employs a composite cathode of the type comprising a hydrophobic polymer member layered with catalyst. A current collector is also provided in releaseable engagement with the catalytic layer, whereby the cell may be repeatedly discharged and recharged without substantial reduction in cathode life and cell performance. By providing an improved two-electrode cell in contrast with rechargeable metal/air cells having three or more electrodes, a simpler, more economical secondary battery system is obtained, having improved life and reliability.

Various designs are presently available for constructing secondary batteries of the galvanic type which employ a metal couple such as nickel/cadmium or silver/zinc batteries. These batteries may be completely self-contained; that is, the components which participate in the electrochemical reaction are provided within the battery structure. When a battery of this type is recharged by placing it under load and drawing off an electrical current, both anode and cathode chemically react and are changed in form. By reversing the polarity of the battery and applying an external potential, the cathode and anode members theoretically can be completely returned or regenerated to their former chemical states, with the battery again being ready for further operation.

The type of seconary battery contemplated in this invention comprises an air or oxygen depolarized cell of the type where only the anode of the cell is chemically changed during operation. Systems employing the metal/oxygen or metal/air systems of the type contemplated herein are described in patents to Oswin et al., U.S. Pat. No. 3,436,270; and to Rosansky, U.S. Pat. No. 3,378,406, all commonly assigned, the subject matter of which is hereby incorporated by reference into this specification.

One of the principal objects of the present invention is to provide an electrically rechargeable electrochemical cell of the air or oxygen depolarization type having only two electrodes.

Another object of the present invention is to provide a two electrode cell, as described above, which is reliable in use, economical in manufacture, and is long lived, i.e., may be repeatedly charged and discharged without substantial fall-off in cell performance.

Still another object of the present invention is to provide a secondary cell of the metal/air type having a composite cathode including an air permeable, hydrophobic membrane with relatively inexpensive depolarizing catalytic material thereon.

A further object of the present invention is to provide a secondary cell of the metal/air type wherein the composite cathode includes a current collector in releaseable engagement to the catalytic layer, and therefore is capable of being electrically separated from the catalytic layer during cell recharge and in contact with the catalytic layer during cell discharge.

Another object of the present invention is to provide versatile secondary battery combinations using appropriate numbers of air depolarized cells of the type described above.

The objects stated hereinabove, as well as others, will become readily apparent from the specification and drawing. These objects are accomplished by constructing a metal/air or metal/oxygen electrochemical cell capable of undergoing approximately one hundred discharge-recharge cycles without significant depreciation in performance. The rechargeable metal/air cell of this invention offers significant improvement in economics, performance and ease of operation in comparison to prior art air depolarized cells and conventional metal-metal galvanic cells used in silver/zinc, lead/acid, and nickel/cadmium batteries. The metal/air cell of the present invention can be of bi-cell construction, having a composite cathode of the envelope type with the anode interposed between the cathode walls, and electrolyte provide between electrodes. Means for retaining the anode and cathode in operable association are also provided. The composite cathode utilizes a gas permeable, liquid impermeable polymer member such as a polytetrafluoroethylene film. A layer of catalyst, preferably of relatively inexpensive material, is conventionally deposited on the inner surface of the member which contacts the electrolyte. A current collector placed adjacent to the catalyst in releasable electrical engagement therewith, completes the cathode structure.

The anode, preferably of metal, may be of porous or solid construction. The anode is positioned within the cathode envelope cavity and electrically separated from the inner walls. Suitable aqueous electrolyte is employed within the anode-cathode cavity. The electrolyte may be trapped in a suitable matrix, such as a regenerated cellulose paper or the like. Contact between the current collector and catalyst during discharge is maintained, for example by compressing means such as clamps or the like as will be more fully described hereinafter.

In addition to the bi-cell construction noted above, rechargeable cells of the present invention can be fabricated in the conventional cylindrical designs of the so-called "D," "C" and "AA" batteries. As in the bi-cell construction the composite cathode will comprise a gas permeable liquid impermeable polymer member having a catalyst layer on its inner surface. The current collector will be in releasable engagement with the catalyst and the anode positioned within the cathode.

During discharge, an air depolarized electrochemical cell of the present invention requires a continual supply of air or oxygen diffusing through the polymer membrane. As the oxygen molecules emerge at the catalytic layer, ionization of the molecule is promoted by the catalyst forming hydroxyl ions which transfer to the anode, thereby completing the cathodic reaction. Where the anode is zinc and oxygen the depolarizing agent, the overall cell electrochemical reaction during discharge may be shown by the following equation:

(1) 
$$Zn + \tfrac{1}{2} O_2 \rightarrow ZnO$$

This overall reaction is obtained by adding the separate electrode reactions occurring during discharge which may be shown as follows:

At the cathode:

(2) 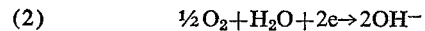
$$\tfrac{1}{2} O_2 + H_2O + 2e \rightarrow 2OH^-$$

At the anode:

(3) 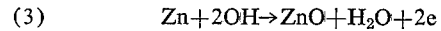
$$Zn + 2OH^- \rightarrow ZnO + H_2O + 2e$$

It is noted that although the electrolyte takes no part in the overall cell reaction, hydroxyl ions are required to sustain the reaction. It may, therefore, be necessary to add water and/or electrolyte from time to time to make up for evaporative losses or the like.

As the cell discharges, the active anodic zinc is completely, or substantially completely, oxidized. At this point the discharge cycle may be said to be terminated and recharge is effected for regenerating the spent zinc anode. The overall cell electrochemical reaction during recharge may be described as being the reverse of Equation 1. To recharge the cell, an external power supply, e.g., regulated direct current, is attached to the electrode terminals and the current collector released from the catalyst of the cathode of the cell. Almost immediately at the beginning of the recharge, oxygen evolves at the cathode to automatically separate the current collector and catalyst layer thereby breaking the electrical contact between them. In this manner, only the current collector is subjected to the recharging current, the catalytic layer being electrically separated therefrom. Thus, it will be apparent that a two electrode cell of this invention combines the advantages of three or more electrode systems while obviating the disadvantages generally associated therewith.

BRIEF DESCRIPTION OF THE DRAWING

FIG. 1 is an exploded view, in perspective, of an improved secondary cell comprising the subject matter of the present invention illustrating a composite cathode of the envelope type and an anode partly broken away to show their internal construction;

FIG. 2 is the improved secondary cell of FIG. 1, in cross section, showing the electrode members in operable association during the charge phase of the charge-discharge cycle;

FIGS. 3 and 3a are enlarged cross-sectional views of a portion of the composite cathode taken substantially along line 3—3 of FIG. 2 illustrating the relationship of the current collector and catalytic layer prior to compression and alternative means of securing the current collector;

FIG. 4 is a perspective view of a complete secondary battery comprising a plurality of electrochemical cells of the present invention;

FIG. 5 is an enlarged diagrammatic view of an electrochemical cell of the present invention under compression, and illustrating the relationship of the cell components during discharge of the cell; and FIG. 6 is an enlarged diagrammatic view of an electrochemical cell of the present invention with compression means released prior to recharge, and illustrating the relationship of the cell components during recharge and particularly the separation of the current collector from the catalytic layer.

DESCRIPTION OF A PREFERRED EMBODIMENT

Referring to the drawing, wherein like numerals indicate like elements throughout the several views, a specific embodiment of an improved two electrode electrochemical cell of the present invention is generally designated by reference numeral 10.

Referring specifically to FIG. 2, the air depolarized electrochemical cell 10 of the present invention is shown in assembled condition, in cross-section, with the anode 12 interposed between the walls of the air electrode or envelope cathode 14. The terms "anode" and "cathode," as used throughout the specification, apply to designated electrodes 12 and 14, respectively, irrespective of whether the cell is undergoing recharging or discharging. The envelope cathode 14 is generally of laminar construction comprising a hydrophobic backing membrane 16, a catalyst layer 18, and a current collector 20, all supported by frame 22. Looking at a transverse section, frame 22 is of U-shape having a cavity 23 adapted to snugly receive the anode member 12, as shown in exploded FIG. 1 and in assembled FIG. 2. Any appropriate means may be used for keeping the anode 12 secured within the envelope cathode 14. For example, chemical means such as adhesives or the like may be applied to abutting surfaces 24, 25 or mechanical means such as a sealing ring (not shown), or a gasket (not shown) may be used where subsequent removal of the anode is desired.

The anode 12 comprises a top portion 26 and a depending porous or solid metal plate 28. If desired, the anode may be securely positioned by using mechanical clips described by Oswin et al. in U.S. Pat. No. 3,436,270. Preferably the anode is formed of porous metal having a porosity of from about 40% to about 85%. To improve the strength and conductivity of the body, a centrally positioned metal screen 30 is generally provided within the body of the anode. A non-conducting electrode separator 32, preferably made of cellulose or porous plastic, is wrapped around and secured to the anode covering the surface adjacent to the cathode inner walls, as best seen in FIG. 1. Thus, the anode is electrically insulated from the cathode. Where the anode is porous, sufficient electrolyte is added to the cell through port 34 to fill the pores and impregnate separator 32. In the event a sheet metal anode is selected, the electrolyte may be added to the pocket of the envelope cathode and allowed to saturate the separator after the anode is secured, or the separator may be saturated with electrolyte prior to insertion of the anode. Element 36 can be utilized for gripping and inserting the anode into the cathode cavity without contacting the electrolyte. An external terminal 38 connecting with the internal positioned conductive screen 30 is also provided.

The anodes which are to be used herein can be any conventional electroconductor employed in a metal/oxygen cell such as metals, metalloids, alloys, and the heavy metal salts. It is essential that the material selected by chemically reactive with a compatible electrolyte and be more electropositive than oxygen. Further, it is essential that the material be electrochemically reversible in order for regeneration to take place. Such materials include lead, zinc, iron, aluminum, magnesium and cadmium.

From the standpoint of cost, capacity, and long-life, zinc is the preferred material. Although the anode can be in the form of a solid, or substantially solid metal sheet, it is preferred that the anode be porous. Porous anodes can be made, for example, by sintering select metal powders. To obtain the desired activity and cycle life, porous anodes having about an 80% porosity have been advantageously used. When deep discharging and rapid recharging characteristics are desired, the high level of anode porosity has been found to be extremely important, if not critical. The active anode material may be amalgamated by the addition of small amounts of mercury and may also contain inert binders and/or metal additives for improved structural integrity and electric conductivity.

The envelope cathode 14 comprises a hydrophobic polymer membrane 16 formed of any polymeric material which is permeable to the passage of oxygen or oxygen containing gases such as air, but is impermeable to liquids such as an aqueous electrolyte. Details of the basic cathode structure are also described in application, Ser. No. 533,516, filed Mar. 11, 1966.

Such polymers normally have a porosity of from about 15 to 85 percent and a uniform pore size distribution of from about 0.01 to about 100 microns. Exemplary polymers are the fluorinated hydrocarbons such as polytetrafluoroethylene, polytrifluoroethylene, polyvinylfluoride, polyvinylidenefluoride, polytrifluorochlorethylene, the hydrophobic co-polymers of two or more of the above materials or with acrylonitrile, methacrylate, or polyethylene. The essential requirement is that the polymer be sufficiently hydrophobic to preclude the passage of an aqueous medium, but still be sufficiently permeable to ambient oxygen to permit the requisite amount of gaseous oxidant to be transported to the catalytic surface. In view of its many desirable characteristics such as its hydrophobicity, resistance to variations in temperature, and its high corrosion resistance, polytetrafluoroethylene is the preferred polymer.

The thickness of the polymer membrane and/or the catalytic layer thereon is not critical. It is only essential that the polymer membrane be sufficiently thick to withstand the pressure and ancillary conditions of its ultimate environment. The membrane preferably will be resilient. The catalytic layer can be relatively thick, but preferably is as thin as possible, primarily from the standpoint of economy. The ability to construct the composite cathode as an exceptionally thin unit contributes to the high energy to weight and energy to volume ratio obtained with the cells. Preferably, the hydrophobic polymer membrane will have a thickness of from about 0.5 to 10 mils, with the optimum range being from 2 to 5 mils. The catalytic layer is kept as thin as possible for purposes of economy and is preferably from about 0.2 to 8 mils in thickness, with the optimum range being from 0.5 to 2 mils.

As may be seen in FIG. 2, the catalyst layer 18 is preferably applied on the inner surface of the hydrophobic member 16 and provides the requisite oxygen electrolyte reaction interface. The catalyst used to coat the hydrophobic polymers are the pure elements, alloys, oxides, or mixtures thereof which are effective in promoting an electrochemical reaction with oxygen. More specifically, operable materials include the elements belonging to Groups I–B, II–B, IV, V, VI, VII, and VIII of the Mendeleev's Periodic Table, as well as alloys, oxides and mixtures of such elements. For example, suitable catalysts include the noble metals such as platinum, palladium, gold, and the like. However, since the catalyst layer employed in this invention is not subjected to the oxidizing recharging voltages normally present in conventional systems, a less expensive catalyst such as silver or alloys thereof and carbon may be utilized.

The current collector 20 may be of any suitable material capable of conducting an electrical current and able to withstand the corrosive environment of the battery. Preferably, this collector will be of a material, or coated with a material, having a lower over-voltage for oxygen evolution than the catalytic material utilized. In practice, a thin, flexible, open type structure must be provided such as a metal screen or grid made of nickel, zirconium, titanium and tungsten, or the like. As shown in the enlarged, partially cutaway sections of FIGS. 3 and 3a, the current collector 20 is secured peripherally at 40 to a non-conducting spacer element 42 which, in turn, overlies the catalyst. Sufficient clearance space designated as 44 is therefore provided by the spacer element 42 to keep the current collector 20 apart from the catalytic layer 18 prior to its being physically compressed into engaging relationship with the catalyst.

Alternatively, in FIG. 3a, the hydrophobic membrane 16 has a thickened portion 46 adjacent the edges and which extend inwardly beyond the catalytic layer 18.

By this construction, integral means for securing the current collector to the membrane is provided. It will be appreciated that the primary purpose is to secure the current collector along a portion of its surface without restricting the major portion of the surface from alternatingly engaging and disengaging itself to the catalytic layer during discharge and recharge.

The electrode separator 32 serves to retain the soluble oxidation products within the wrapped anode compartment whereby precluding, or at least mitigating, the formation of zinc dendrites during recharging. Exemplary of the electrode separators which have been found particularly advantageous are those of the ceramic, paper, and plastic variety. One particularly advantageous plastic employed is an irradiated polyethylene membrane manufactured by General Electric Corporation. Of the cellulosic materials found useful one type identified as Visking is sold by the Union Carbide & Chemical Corporation of New York, N.Y., and is especially preferred.

The cells will operate on conventional electrolytes including the alkaline materials such as sodium hydroxide, potassium hydroxide, mixtures of potassium and rubidium hydroxide and the like. Acid electrolytes including sulphuric acid, phosphoric acid, and hydrochloric acid may be employed. As is apparent, depending upon the particular electrolyte used, different anode materials can be selected. It is also feasible, and at times desirable, to employ an electrolyte which is trapped in a suitable matrix such as those made up of hydrophilic polymers, ceramic materials, and the like.

To illustrate the mechanism whereby engagement and disengagement is effected, reference to the views shown in FIGS. 5 and 6 is made. In FIG. 5 external compression forces are applied to the electrochemical cell along the outside surface of the hydrophobic membrane. This places the current collector 20 into physical contact with the catalytic layer 18 substantially across the entire surface of the catalytic collector screen. Thus, during discharge, current will flow from the catalytic layer to the current collector and outwardly to the external terminal 48. At the completion of discharge, i.e., when the anode is exhausted, a recharging operation is implemented. First, the cells are loosened by relaxing or removing the compressive force. The cell terminals are then connected to an external source of regulated current and current passed into the cell for a predetermined period of time. Oxygen evolves almost immediately at the current collector and diffuses outwardly through the hydrophobic membrane 16. At times it may be desirable to leave a small space or "window" in membrane 16, for example in the vicinity of spacer element 42, uncovered by catalyst to permit more rapid venting of the evolved oxygen gas. A pressure differential is created by the evolving gas which aids in separating the current collector from the coated hydrophobic membrane. This condition is shown clearly in FIG. 6 wherein the current collector is electrically isolated from the catalytic layer for the duration of the recharging cycle. The bulge, somewhat exaggerated and shown in FIG. 6, is due to the higher internal pressure resulting from the evolved oxygen. In this manner, recharging is effected without causing damage to the catalyst. After recharge, compression is restored and the current collector placed in contact with the catalyst, thereafter an external load is connected and the battery is again ready for service. Although the illustrated cells have the catalyst layer separated from the current collector by means of a spacer element, it is possible to leave the current collector normally in contact with the catalyst with the two elements being pushed apart or separated as a result of gas pressure built up as a result of gas generated during charging. This is possible by using resilient polymer membranes.

In FIG. 4 a lightweight battery assembly composed of five zinc/air depolarized electrochemical cells of the type shown in FIGS. 1–3 is shown. The battery dimensions are approximately 2¾" x 5½" x 3¾", yielding about 6 volts. Where desired, an enclosure may be provided with or without blower means for supplying air to the cell. As shown, the module is held together by means of end plates 50, cell spacers 52 positioned between the cells and end plates 50 to permit access of air or oxygen to the cathode, and support bars 54 each provided with suitable compression clamps 56. Clamps 56 turn inwardly to force the current collector 20 into electrical engagement with the catalytic layer 18 and to keep the cells properly positioned. The spacer 52 may be of any conventional material having an open or porous structure to permit air to pass therethrough to each of the cells in the battery. As will be readily appreciated, various modifications can be made in the design of the spacer, compression plate, and clamping means, and still fulfill the essential utility of the battery.

Although the current take-off is not shown in the drawing, this can be any conventional plug arrangement. A convenient means of taking off the current will be readily apparent to one skilled in the art. Further, where it is desirable to obtain a greater voltage from a given battery, the envelope cathode may be separated to provide two distinct cathodes. Accordingly, the anodes of the battery must be electrically split and constructed so as to provide two separate electrolyte compartments. By connecting the cathodes and anodes of each cell in series, it is thereby possible to obtain an increased voltage. Such cells are still considered to be bi-cells.

From the foregoing description, it will be readily apparent that the two electrode metal/air cell comprising the subject matter of this invention enjoys significant advantages over prior art devices in that rapid recharging and long life, i.e., numerous discharge-recharge cycles, are provided. Unlike prior art secondary metal/air rechargeable batteries, the electrochemical cell of the present invention is capable of being discharged and recharged at discharge rates up to 60 ma./cm.$^2$, at least one hundred times without significant deterioration in output and performance. In addition, the operation and cost of manufacture is far less than cells employing auxiliary electrodes.

Having described the invention in general terms, the following examples are set forth with reference to the drawing to more particularly illustrate the invention. These examples, however, are not meant to be limiting.

EXAMPLE 1

Secondary zinc/air cells are constructed substantially as shown in FIG. 2. The zinc anode structure is about 80% porous, comprising about 4% by weight mercury and having a thickness of up to 0.270 inch. The separator is a 1.5 mil (0.0015 inch) polyethylene membrane; both the anode and separator being impregnated with a 34% aqueous KOH electrolyte. The composite cathode includes a polytetrafluoroethylene membrane of about 7 mils precoated on the inner surface with a uniform layer of a catalyst comprising a 10–3 aqueous mixture of platinum black and polytetrafluoroethylene particles having a 5 mil thickness. Along the periphery of the hydrophobic polymer membrane, a polytetrafluoroethylene border is placed over the catalytic layer and secured to the underlying membrane with an epoxy adhesive or the like. An expanded nickel mesh is pressed into the peripheral border in spaced relationship to the catalytic layer.

After the electrodes are assembled and electrically connected, it provides a peak discharge density of 160 ma./cm.$^2$, a peak recharge density of 50 ma./cm.$^2$. Most importantly, the cell yields in excess of 100 discharge-recharge cycles at a discharge rate of 60 ma./cm.$^2$. The recharging cathode potential is 1.7 volts versus standard hydrogen electrode (SHE). This compares favorably with primary cells where the potential never exceeds 1.06 volts versus SHE. At ambient temperatures, the cell provides an open circuit voltage of 1.45 volts.

EXAMPLE 2

A secondary cell is constructed similar to that of Example 1 with the exception that cadmium is substituted as the anode material. This cell also offers favorable cycle life and reliability. However, the open circuit voltage and the operating cell voltage are lower than that obtained using a zinc anode. For example, this cell has an open circuit voltage of 1.1 volts, and an operating voltage of 0.8 volts.

The energy density for the cadmium/air system is between 30–40 w.-hr./lb. This is about 25–30% lower than that obtained with the zinc/air system.

EXAMPLE 3

A secondary cell is constructed similar to that of Example 1 with the exception that iron is used as the anode material. The open cell voltage and operating voltage falls between the cadmium/air and zinc/air systems, i.e., between 1.45 volts to 1.15 volts and 1.0 volts to 0.8 volt respectively.

From the foregoing description and accompanying drawing, it will be evident that the present invention comprising a two electrode secondary metal/air depolarized electrochemical cell represents a unique solution to the heretofore unsolved problem of catalyst degradation in secondary systems employing two electrodes. By providing a current collector in releaseable engagement with the catalyst layer the convenience of a two electrode system is obtained without the added expense or trouble associated with three or more electrode systems. Further, the present system as described herein above permits utilization of less expensive catalysts even where recharging at higher voltages is recommended.

What is claimed is:

1. A metal/air or metal/oxygen depolarized cell capable of undergoing repeated discharge and recharge cycles comprising a regenerable metal anode, an oxygen depolarized cathode comprising a gas-permeable resilient hydrophobic polymer membrane having a conductive catalyst layer on said membrane and current collector means adjacent to said catalyst layer of said membrane, and means constructed and arranged with said current collector and said membrane which spaces said catalyst layer on said membrane from said current collector in the absence of pressure but which permits the contacting of said catalyst layer with said current collector over substantially the entire surface area of said catalyst layer when pressure is applied to said membrane.

2. A depolarized cell of claim 1 in which releaseable compression means are included to move said current collector into contact with said catalytic layer for discharge, and to disengage said current collector from said catalytic layer at the start of recharge.

3. A depolarized cell in accordance with claim 1 wherein said anode is a metal taken from the group consisting of zinc, cadmium, lead, iron, and mixtures thereof.

4. A depolarized cell in accordance with claim 3 in which the anode is porous zinc having from 40% to 85% porosity.

5. A depolarized cell in accordance with claim 4 wherein said anode includes a hydrophilic separator wrapped substantially around said anode.

6. A depolarized cell in accordance with claim 5 wherein said electrolyte is alkaline.

7. The depolarized cell in accordance with claim 1 wherein the polymeric membrane is sufficiently resilient to remain in contact with said current collector during discharge but is deflected out of contact during charging as a result of pressure of oxygen gas evolution.

8. A depolarized cell in accordance with claim 2 in which the hydrophobic polymeric membrane is a fluorinated hydrocarbon.

9. A depolarized cell in accordance with claim 1 in which the current collector comprises a material having a lower over-potential for oxygen evolution than the catalyst layer.

10. A battery comprising a plurality of cells as defined in claim 1 with said cells being separated with an inter-cell spacer to permit the passage of oxygen to said oxygen-permeable cathodes.

11. The depolarized cell in accordance with claim 1 wherein said membrane and said means constructed and arranged with said current collector are integral.

12. A depolarized cell in accordance with claim 8 wherein the fluorinated hydrocarbon is polytetrafluoroethylene.

13. A depolarized cell in accordance with claim 12 in which the current collector is nickel.

14. A depolarized cell in accordance with claim 13 in which the nickel current collector is a nickel mesh.

15. A depolarized cell in accordance with claim 13 in which the nickel current collector is a nickel fine pore layer.

16. A depolarized cell in accordance with claim 9 in which said material is lithiated nickel oxide.

17. A depolarized cell in accordance with claim 9 in which said material is a cobalt/nickel spinel.

References Cited
UNITED STATES PATENTS

| | | | |
|---|---|---|---|
| 3,607,422 | 9/1971 | Moran | 136—86 A |
| 3,518,123 | 6/1970 | Katsoulis et al. | 136—86 |

ALLEN B. CURTIS, Primary Examiner

H. A. FEELEY, Assistant Examiner

U.S. Cl. X.R.

136—164

UNITED STATES PATENT OFFICE
CERTIFICATE OF CORRECTION

Patent No. 3,759,748          Dated September 18, 1973

Inventor(s) N. I. Palmer

It is certified that error appears in the above-identified patent and that said Letters Patent are hereby corrected as shown below:

Column 3, line 66, after "permeable" insert a comma (,). Column 4, line 16, the formula should appear as follows:

(3)

Column 6, line 47, "Mendeleev's" should read -- Mendelyeev's --.
Column 10, line 16, claim 8, "claim 2" should read -- claim 1 --.

Signed and sealed this 10th day of September 1974.

(SEAL)
Attest:

McCOY M. GIBSON, JR.          C. MARSHALL DANN
Attesting Officer               Commissioner of Patents